United States Patent
Asayama et al.

(10) Patent No.: US 6,454,675 B2
(45) Date of Patent: Sep. 24, 2002

(54) LINE PRESSURE CONTROL DEVICE AND METHOD FOR CONTINUOUSLY VARIABLE TRANSMISSION

(75) Inventors: Hiroki Asayama; Tatsuo Nakamura, both of Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/842,090

(22) Filed: Apr. 26, 2001

(30) Foreign Application Priority Data

Apr. 26, 2000 (JP) .......................................... 2000-126050

(51) Int. Cl.[7] .............................................. B60K 41/12
(52) U.S. Cl. .............................. 477/45; 477/50; 474/28; 701/54
(58) Field of Search .............................. 477/45, 48, 50; 474/28; 701/51, 54

(56) References Cited

U.S. PATENT DOCUMENTS 5,459,662 A  * 10/1995  Tezuka et al. .............. 123/333
5,720,692 A  *  2/1998  Kashiwabara ................ 474/28
5,890,991 A  *  4/1999  Sakakiyama ................ 477/46

FOREIGN PATENT DOCUMENTS

| JP | 4050440 A | 2/1992 |
| JP | 5048386 A | 7/1993 |
| JP | 408258595 | * 10/1995 |

* cited by examiner

Primary Examiner—Sherry Estremsky
Assistant Examiner—Tisha D. Lewis

(57) ABSTRACT

A line pressure control device for a continuously variable transmission comprises: a target line pressure setting part that sets a target value of a line pressure, which is able to adjust a clamping force applied to a transmission member of the continuously variable transmission; and an engine torque suppressing part that suppresses an engine torque to prevent the transmission member from slipping. When it is impossible to suppress the engine torque and thus a torque non-suppressible flag is set, the target value of the line pressure is corrected to a greater value to prevent the transmission member from slipping. Otherwise, the target value of the line pressure is set to a smaller value. This makes it possible to surely prevent the transmission member from slipping.

17 Claims, 3 Drawing Sheets

LINE PRESSURE CONTROL DEVICE AND METHOD FOR CONTINUOUSLY VARIABLE TRANSMISSION

Cross Reference

This application claims the benefit of Japanese Application No. 2000-126050, filed Apr. 26, 2000, which is hereby incorporated by reference.

BACKGROUND OF THE INVENTION

1. Field of the Invention

The present invention relates to a line pressure control device that controls a line pressure applied to a continuously variable transmission (hereinafter referred to as "CVT") provided in a vehicle.

2. Description of Related Art

In recent years, a CVT provided in a wide variety of vehicles is constructed in such a manner as to supply a primary pulley and a secondary pulley, which are connected to one another through a belt, with hydraulic fluids provided by an oil pump to thereby adjust the effective diameters of both pulleys and transmit a driving force from an engine to driving wheels at a speed ratio corresponding to the driving condition of a vehicle. To prevent a belt slip caused by the transmission of power, the pulleys always apply a clamping force to the belt by receiving the line pressure provided by the oil pump. To prevent the belt slip, the line pressure should be set to a high level so as to apply a strong clamping force to the belt. The increase in the line pressure, however, leads to a loss of energy generated by an engine that is driving the oil pump. It is therefore desirable to adjust the clamping force by controlling the line pressure according to a torque that is transmitted between both pulleys (i.e. a torque inputted to the CVT).

For example, Japanese Patent Publication No. 5-48386 discloses a line pressure control device that calculates an engine torque from a throttle angle and an engine speed, and sets a target line pressure according to the calculated engine torque (regarded as the torque inputted to the CVT) and a speed ratio of the CVT. A margin is allowed for the target line pressure due to a potential calculation error, a mechanical error of the CVT and the like. If, however, the engine torque rapidly increases due to sudden operation of an accelerator pedal, for example, the hydraulic pressure control to increase the line pressure of the CVT cannot follow the increase in the engine torque. As a result, the line pressure becomes lower with respect to the engine torque, and a clamping force corresponding to the engine torque cannot be applied to the belt. This leads to the temporary shortage of the clamping force and results in the belt slip.

If the margin for the target line pressure is increased in expectation of the above situation, the oil pump loses an excessive amount of energy in a normal state. To solve this problem, a line pressure control device disclosed in Japanese Patent Provisional Publication No. 4-50440, for example, transitionally suppresses the engine torque until the change in the line pressure follows the increase in the engine torque. This aims at preventing the belt slip without increasing the margin for the target line pressure The engine torque is suppressed by retarding an ignition timing and the like, but it's impossible to suppress the engine torque in every operational condition. For example, if a cooling water temperature is low, the retardation of the ignition timing causes unstable combustion. If an engine speed lies in a high speed range, the retardation of the ignition timing abnormally increases an exhaust temperature and causes damage to catalysts. In other words, the engine torque cannot be suppressed under some operational conditions. Therefore, the line pressure control device disclosed in the above publication is unable to surely prevent the belt slip when it is impossible to suppress the engine torque.

SUMMARY OF THE INVENTION

It is therefore an object of the present invention to provide a line pressure control device and method for a continuously variable transmission, which is able to surely prevent a rotary element of the continuously variable transmission from slipping.

To attain the above object, the present invention provides a line pressure control device for a continuously variable transmission having a first rotary element and a second rotary element in contact with the first rotary element, comprising: a hydraulic pressure control unit for adjusting a line pressure operating on the first rotary element of the continuously variable transmission; a line pressure control unit for setting a target line pressure based on an output torque of an engine and controlling said hydraulic pressure control unit such that an actual line pressure matches the target line pressure; and an engine output torque suppressing unit for determining, whether the output torque can be sufficiently suppressed, such that the first and second rotary elements can be prevented from slipping, based on an operating condition of an engine, and temporarily suppressing the output torque when the output torque can be sufficiently suppressed, wherein said line pressure control unit coercively increases the target line pressure when said engine output torque suppressing unit determines that the output torque cannot be sufficiently suppressed.

The present invention also provides a line pressure control method for a continuously variable transmission having a first rotary element and a second rotary element in contact with the first element, comprising: setting a target line pressure based on an output torque of an engine; controlling an actual line pressure such that an actual line pressure matches the target line pressure; determining whether the output torque can be sufficiently suppressed, such that the first and second rotary elements can be prevented from slipping, based on an operating condition of an engine; suppressing the output torque when the output torque can be sufficiently suppressed; and coercively increasing the target line pressure when the output torque cannot be sufficiently suppressed.

BRIEF DESCRIPTION OF THE DRAWINGS

The nature of this invention, as well as other objects and advantages thereof, will be explained in the following with reference to the accompanying drawings, in which like reference characters designate the same or similar parts throughout figures and wherein.

DETAILED DESCRIPTION OF THE PREFERRED EMBODIMENT

A preferred embodiment of a line pressure control device for a continuously variable transmission according to the present invention will hereunder be described in further detail with reference to the accompanying drawings.

Figure 1:
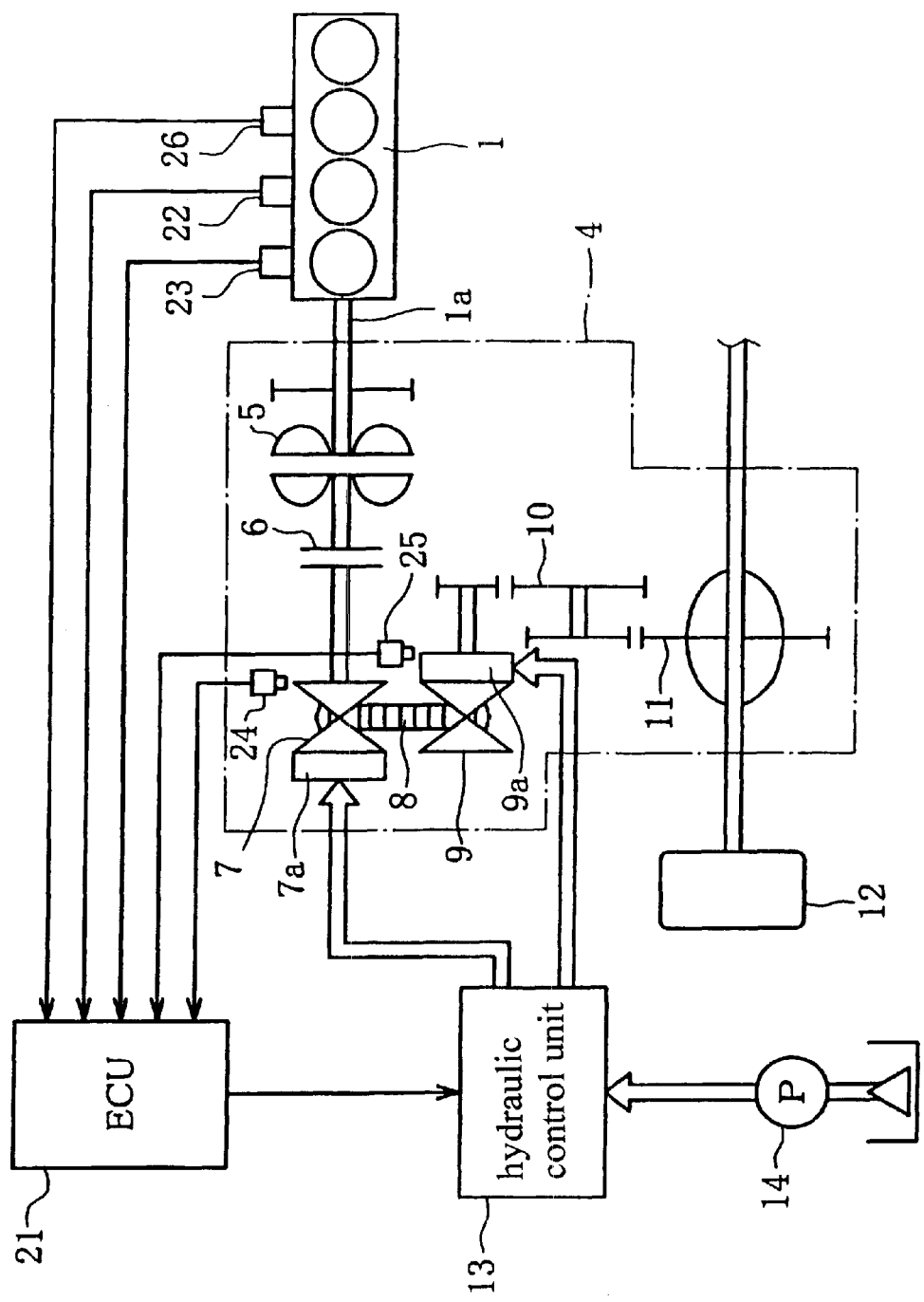
FIG. 1 is a block diagram showing the entire structure of a line pressure control device for a continuously variable transmission according to an embodiment of the present invention.

As shown in the block diagram of FIG. 1 showing the entire structure of the line pressure control device, an engine 1 provided in a vehicle is connected to a CVT 4. A crank shaft 1a of the engine 1 is connected to a primary pulley 7 via a torque converter 5 and a clutch 6, which switches the running direction of the vehicle between forward and backward directions (not described in detail), in the CVT 4. The primary pulley 7 is connected to a secondary pulley 9 through an endless belt 8 as a transmission member, and the secondary pulley 9 is connected to a driving wheel 12 via a speed reducing mechanism 10 and a differential gear 11. In the CVT 4, power is transmitted between the primary pulley 7 and the secondary pulley 9 through the belt 8. This causes a driving force to be transmitted from the engine 1 sequentially to the primary pulley 7, the belt 8, the secondary pulley 9, the speed reducing mechanism 10, the differential gear 11, and the driving wheel 12.

The CVT 4 is constructed in such a manner as to change speed ratio by adjusting the respective effective diameters of the primary pulley 7 and the secondary pulley 9 to change a revolution speed ratio thereof.

An oil pump 14 of the CVT 4 is driven by the driving force, which is transmitted from the crank shaft 1 a of the engine 1, through a transmission mechanism that is not illustrated. Hydraulic fluids provided by the oil pump 14 are regulated to line pressure by a hydraulic control unit 13 and then operating fluids that is based on the line pressure are supplied to a hydraulic actuator 7a of the primary pulley 7 and a hydraulic actuator 9a of the secondary pulley 9.

The effective diameters of the pulleys 7, 9 are changed relative to one another according to the supplying condition of the hydraulic fluids that are supplied from the hydraulic control unit 13 to the respective hydraulic actuators 7a, 9a. As a result, the revolution speed ratio of the pulley 7 to the pulley 9 is changed to control a speed ratio. According to the speed ratio, the driving force of the engine 1 is reduced and transmitted to the driving wheel 12. The secondary pulley 9 always applies a clamping force to the belt 8 by using the line pressure that has been regulated by the hydraulic control unit 13 as stated above. The application of this clamping force prevents the belt 8 from slipping.

In a vehicle compartment, an ECU (electronic control unit) 21, which has a storage device (e.g. ROM and RAM), a central processing unit (CPU), a timer counter and so forth is provided. The ECU 21 totally controls the engine 1 and the CVT 4.

The ECU 21 is connected to a throttle sensor that detects a throttle angle TPS of a throttle valve in the engine 1, an engine revolution speed sensor that detects a revolution speed Ne of the engine 1, a primary revolution speed sensor 24 that detects a revolution speed Np of the primary pulley 7, a secondary revolution speed sensor 25 that detects a revolution speed Ns of the secondary pulley 9, a water temperature sensor 26 that detects the temperature of cooling water in the engine 1, and other sensors. The ECU 21 receives sensor information from those sensors.

The ECU 21 is also connected to an igniter, a fuel injector and the like, not shown, of the engine 1 as well as the hydraulic control unit 13 of the CVT 4.

According to the information from the sensors and switches, the ECU 21 executes an ignition timing control and a fuel injection control for the engine 1, and causes the CVT 4 to control the speed ratio and the line pressure.

To cause the CVT 4 to control the speed ratio, the ECU 21 sets a target speed ratio according to a vehicle speed V calculated from the secondary revolution speed Ns and the throttle angle TPS and then controls the hydraulic control unit 13 so that an actual speed ratio R (the primary revolution speed Np/the secondary revolution speed Ns) matches the target speed ratio.

Figure 2:
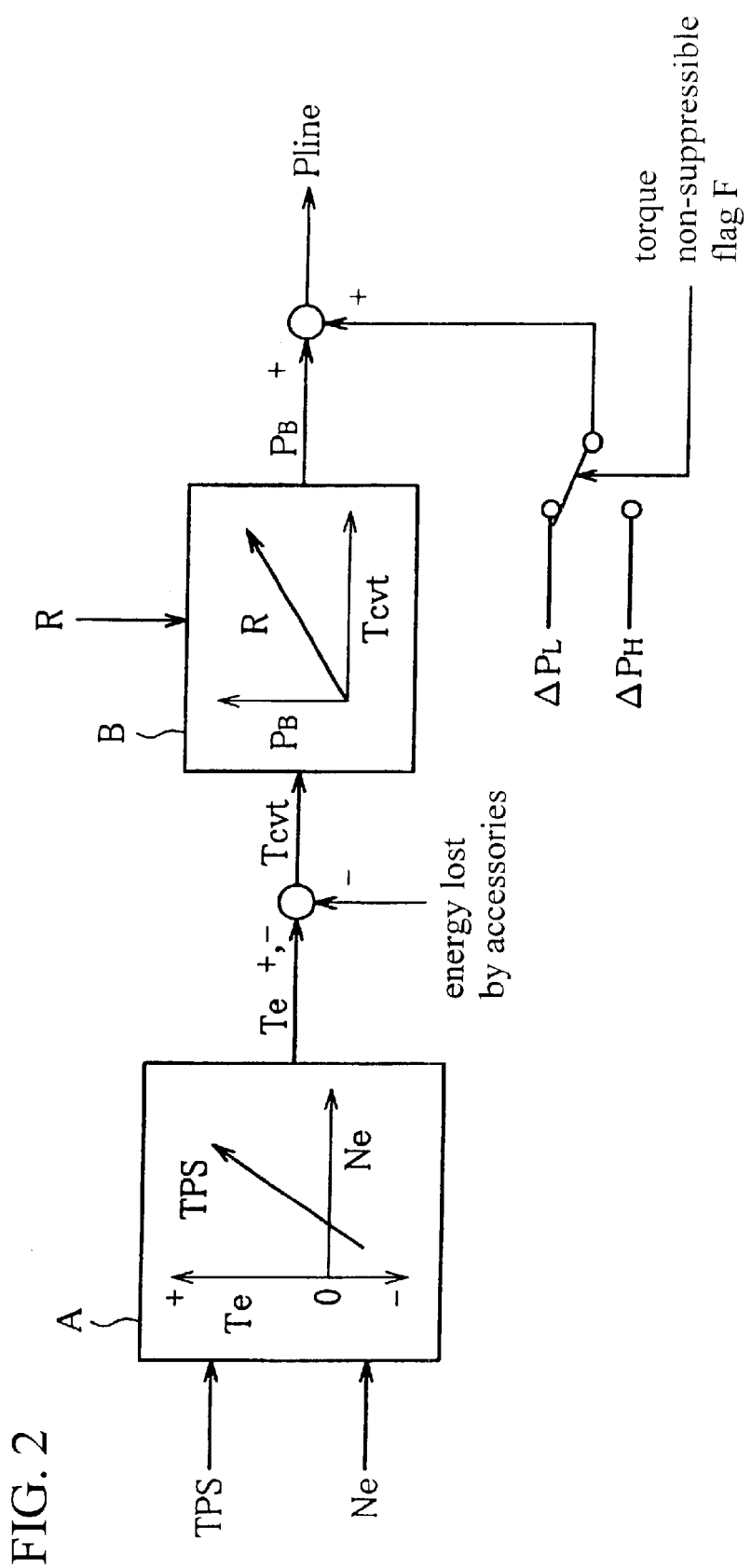
FIG. 2 is an explanatory drawing showing the procedure for setting a target line pressure by a line pressure control device for a continuously variable transmission according to an embodiment of the present invention.

To cause the CVT 4 to control the line pressure, the ECU 21 sets a target line pressure $P_{line}$ in the procedure shown in FIG. 2 and then controls the hydraulic control unit 13 so that an actual line pressure matches the target line pressure $P_{line}$.

The procedure for setting the target line pressure $P_{line}$ will now be described with reference to FIG. 2. First, the ECU 21 calculates a map engine torque Te from the throttle angle TPS and the engine revolution speed Ne according to a map A produced on the basis of the specifications of the engine 1 and the like. Next, an energy loss by accessories (e.g. a compressor of an air conditioner) driven by the engine 1 is subtracted from the map engine torque Te to determine an input torque Tcvt, which is actually inputted to the CVT 4. A basic line pressure $P_B$ is calculated from the input torque Tcvt and the actual speed ratio R.

The basic line pressure $P_B$ is calculated according to a map B produced on the basis of the specifications of the CVT 4 and the like. According to the present embodiment, the basic line pressure PB is set to a net hydraulic pressure, which can prevent the belt slip, without allowing a margin in expectation of a calculation error, a mechanical error of the CVT 4 or the like.

A target line pressure $P_{line}$ is then calculated by adding a margin $\Delta P$ to the calculated basic line pressure $P_B$. Two margins $\Delta P_L$, $\Delta P_H$ are set as the margin $\Delta P$. One margin $\Delta P_L$ is a value equivalent to the calculation error, the mechanical error of the CVT 4 or the like. The other margin $\Delta P_H$ is a value obtained by adding a predetermined value to the margin $\Delta P_L$ to prevent the belt slip caused by the shortage of the belt clamping force when the increase in the line pressure cannot follow the fluctuation in the torque of the engine 1 as will be described later. Thus, the margin $\Delta P_H$ is greater than the margin $\Delta P_L$. As to which margin should be applied between $\Delta P_H$ and $\Delta P_L$ is determined according to a torque non-suppressible flag F set under the control of the engine 1. More specifically, the smaller margin $\Delta P_L$ is applied when the torque non-suppressible flag F is cleared, and the greater margin $\Delta P_H$ is applied when the torque non-suppressible flag F is set. The hydraulic control unit 13 controls the actual line pressure of the CVT 4 according to the target line pressure $P_{line}$ calculated by applying the margin $\Delta P$.

On the other hand, as is the case with the prior art, the ignition timing control and the fuel injection control for the engine 1 are executed according to an ignition timing and a fuel injection volume that are determined according to the operating state of the engine 1. Further, according to the present embodiment, an engine torque is suppressed by retarding the ignition timing or the like in order to prevent the belt slip when the condition of the CVT 4 is a condition that there is the shortage of the clamping force, which is applied to the belt 8 according to the line pressure control, as stated previously.

For example, if the engine torque rapidly increases due to sudden operation of an accelerator pedal by a driver, a fluctuation in the engine torque is reflected by the target line pressure $P_{line}$ through the map engine torque Te determined by the throttle angle TPS as stated above. Since the increase in the line pressure under the control of the hydraulic control unit 13 is delayed with respect to the rise of the engine torque, however, the engine torque transitionally exceeds a torque that can be transmitted by the CVT 4. This results in the belt slip.

In this situation, the ECU 21 transitionally retards the ignition timing and suppresses the engine torque until the change in the line pressure follows the increase in the engine torque. This prevents the belt slip.

The ignition timing cannot be retarded under some operational conditions of the engine 1. For example, the ignition timing cannot be retarded if the cooling water temperature of the engine 1 is low and the engine is running in a high speed range. Under such an operational condition that it is impossible to suppress the engine torque by retarding the ignition timing, the ECU 21 sets the torque non-suppressible flag F. In response to the flag F, the margin $\Delta P$, which is applied in the calculation of the target line pressure $P_{line}$ in the control of the line pressure, is changed from $\Delta P_L$ to $\Delta P_H$. This increases the margin $\Delta P$ and corrects the target line pressure to a greater value.

Figure 3:
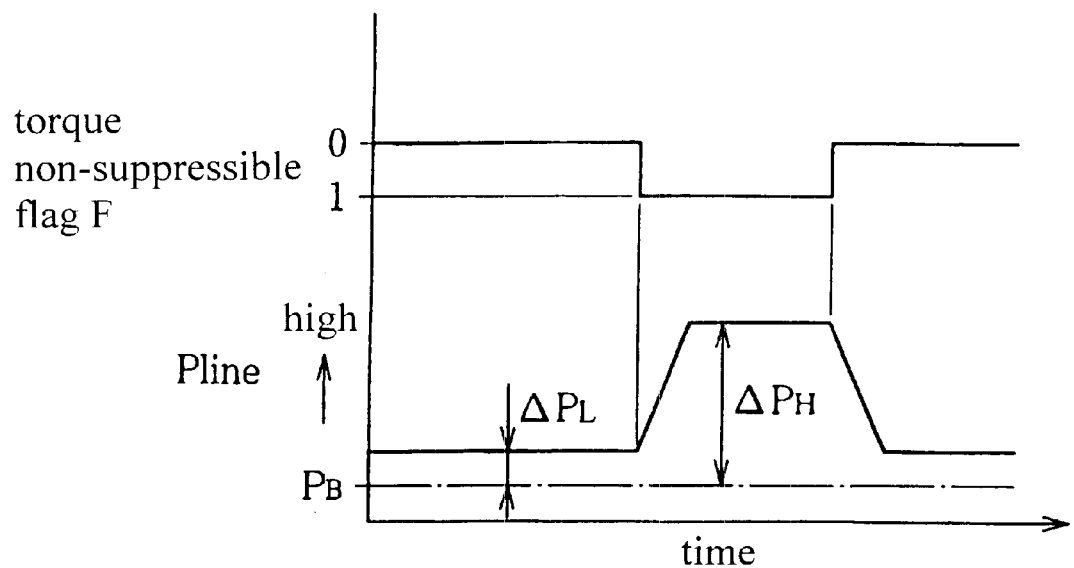
FIG. 3 is a time chart showing the situation wherein a target line pressure is set according to a torque non-suppressible flag by a line pressure control device for a continuously variable transmission according to an embodiment of the present invention.

Referring next to the time chart of FIG. 3, there will be described the situation where the target line pressure $P_{line}$ is determined according to the torque non-suppressible flag F.

The torque non-suppressible flag F is cleared (reset) when the engine 1 is operating under the condition that it is possible to retard the ignition timing. Therefore, the smaller margin $\Delta P_L$ is applied as the margin $\Delta P$ in the control of the line pressure so that the target line pressure $P_{line}$ can be set to a smaller value. The ignition timing of the engine 1 is retarded to suppress the engine torque when there is a fear of the shortage of the clamping force applied to the belt 8 by the line pressure because the increase in the line pressure is delayed with respect to the rise of the engine torque due to the sudden operation of the accelerator pedal. This prevents the belt of the CVT 4 from slipping.

On the other hand, the torque non-suppressible flag F is set when the engine 1 is operating under the condition that it is impossible to retard the ignition timing. The greater margin $\Delta P_H$ is applied as the margin $\Delta P$ in the control of the line pressure so that the target line pressure $P_{line}$ can be set to a greater value. In this case, it is impossible to suppress the torque of the engine 1, but the belt clamping force can be increased since a greater margin is allowed for the target line pressure $P_{line}$ in expectation of the belt slip. Therefore, the belt of the CVT 4 is prevented from slipping even when the increase in the line pressure is delayed with respect to the rise of the engine torque.

Further, when the engine 1 returns to the operational condition that it is possible to retard the ignition timing, the torque non-suppressible flag F is reset and the smaller margin $\Delta P_L$ is applied as the margin $\Delta P$ again. Thus, the line pressure $P_{line}$ is set to a smaller value again and the engine torque is suppressed as required. When the target line pressure $P_{line}$ is changed, a trailing control is executed in order to prevent a shock produced by a fluctuation in the energy lost by the oil pump 14, which is the source of the line pressure.

The energy loss by the oil pump 14 is suppressed to a necessary and minimum level because the target line pressure $P_{line}$ is corrected to a greater value only when it is impossible to suppress the torque of the engine 1, and the target line pressure $P_{line}$ is set to a smaller value when it is possible to suppress the torque. Thus, the line pressure control device for the continuously variable transmission according to the present embodiment is able to surely prevent the slip of the belt (the transmission member) and suppress the energy that is lost by the oil pump 14 due to an undue increase in the margin for the target line pressure $P_{line}$. This results in the improvement of fuel economy.

It should be understood, however, that there is no intention to limit the invention to the above embodiment. According to the above embodiment, the ECU 21 controls both the engine 1 and the CVT 4 and changes the target line pressure $P_{line}$ according to whether the torque non-suppressible flag F is set or not; however, the present invention should not be restricted to this. For example, the engine 1 and the CVT 4 may be controlled by separate ECUs. In this case, one ECU for the CVT 4 changes the target line pressure $P_{line}$ according to information regarding the possibility of the torque suppression from the other ECU for the engine 1.

According to the present embodiment, the trailing control is executed in order to prevent a shock produced by the change in the target line pressure $P_{line}$ and delays a change completion timing of the target line pressure $P_{line}$, but the present invention should not be restricted to this. For example, when only a small shock is produced even if the line pressure changes suddenly, the target line pressure $P_{line}$ may be changed step by step without executing the trailing process.

In the control of the engine 1, a timing for setting or resetting the torque non-suppressible flag F can be freely determined in switching the control state between the torque suppressible state and the torque non-suppressible state. Thus, in order to switch the control state from the torque suppressible state to the torque non-suppressible state, the torque non-suppressible flag F is set in advance and the control state of the engine 1 is switched to the torque non-suppressible state when the trailing control completes the increase in the target line pressure $P_{line}$.

According to the above embodiment, to determine the target line pressure $P_{line}$, the two kinds of margins $\Delta P_L$, $\Delta P_H$ are used according to whether it is possible to suppress the torque of the engine 1 or not. Other factors, however, may be taken into account in determining the target line pressure $P_{line}$. For example, in order to cover the dispersion of stall torque ratios of the torque converter 5 in the CVT 4, it is necessary to apply a greater margin. However, application of the greater margin causes the line pressure to fluctuate when a lockup clutch is not engaged. Thus, two kinds of margins are newly designated as the margin according to the operating state of the lockup clutch. When the lockup clutch is engaged and is not affected by the torque converter, the smaller margin is applied in the calculation of the target line pressure $P_{line}$, and when the lockup clutch is disengaged and is affected by the torque converter, the greater margin is applied in the calculation of the target line pressure $P_{line}$.

On the other hand, the ignition timing is retarded in order to suppress the torque of the engine 1 according to the above embodiment, but another measure may be taken in order to suppress the torque of the engine 1. For example, in the case of an engine that the throttle valve is opened and closed by means of an electronic control motor, the engine torque can be suppressed by controlling the throttle angle to a smaller angle. Alternatively, in the case of a direct injection type engine that directly injects fuel into a combustion chamber, the engine torque can be suppressed by controlling an air-fuel ratio to a lean ratio.

The above-described embodiment is applied to the belt type continuously variable transmission, but the present invention may also be applied to other continuously variable transmissions such as a toroidal type continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A line pressure control device for a continuously variable transmission having a first rotary element and a second rotary element in contact with the first rotary element, comprising:

a hydraulic pressure control unit for adjusting a line pressure operating on the first rotary element of the continuously variable transmission;

a line pressure control unit for setting a target line pressure based on an output torque of an engine and controlling said hydraulic pressure control unit such that an actual line pressure matches the target line pressure; and an engine output torque suppressing unit for determining, whether the output torque can be sufficiently suppressed, such that the first and second rotary elements can be prevented from slipping, based on an operating condition of an engine, and temporarily suppressing the output torque when the output torque can be sufficiently suppressed, wherein said line pressure control unit coercively increases the target line pressure when said engine output torque suppressing unit determines that the output torque cannot be sufficiently suppressed.

2. A line pressure control device, according to claim 1, wherein said line pressure control unit adds a margin to a basic line pressure.

3. A line pressure control device, according to claim 2, wherein said line pressure control unit adds a first margin when said engine output torque suppressing unit determines that the output torque can be sufficiently suppressed, and adds a second margin greater than the first margin when said engine output torque suppressing unit determines that the output torque cannot be sufficiently suppressed.

4. A line pressure control device, according to claim 1, wherein said engine output torque suppressing unit determines that the output torque cannot be sufficiently suppressed when a temperature of an engine cooling water is lower than a predetermined value.

5. A line pressure control device, according to claim 1, wherein said engine output torque suppressing unit determines that the output torque cannot be sufficiently suppressed when an engine speed is higher than a predetermined value.

6. A line pressure control device, according to claim 1, wherein said engine output torque suppressing unit suppresses the output torque by at least one of retarding an ignition timing of the engine, reducing a fuel injection amount, and reducing an intake air volume.

7. A line pressure control device, according to claim 1, wherein said line pressure control unit gradually decreases the target line pressure from a coercively increased target line pressure after said engine output torque suppressing unit determines that the engine torque can now be sufficiently suppressed.

8. A line pressure control device, according to claim 1, wherein said line pressure control unit gradually increases the target line pressure to a coercively increased target line pressure after said engine output torque suppressing unit determines that the engine torque cannot be sufficiently suppressed.

9. A line pressure control device, according to claim 3, wherein said first margin is determined based on at least one of a calculation error, a mechanical error of the continuously variable transmission, and said second margin is obtained by adding a predetermined value to said first margin.

10. A continuously variable transmission, comprising:

a first pulley connected to an engine;

a second pulley connected to a vehicle wheel;

a belt provided between the first and second pulleys to transmit torque between the first and second pulleys;

a hydraulic pressure control unit for adjusting a line pressure operating on at least one of the first and second pulleys;

a line pressure control unit for setting a target line pressure based on an output torque of the engine and controlling said hydraulic pressure control unit such that an actual line pressure matches the target line pressure; and an engine output torque suppressing unit for determining, whether the output torque can be sufficiently suppressed, such that the first and second rotary elements can be prevented from slipping, based on an operating condition of an engine, and temporarily suppressing the output torque when the output torque can be sufficiently suppressed, wherein said line pressure control unit coercively increases the target line pressure when said engine output torque suppressing unit determines that the output torque cannot be sufficiently suppressed.

11. A line pressure control device, according to claim 10, wherein said line pressure control unit adds a margin to a basic line pressure.

12. A continuously variable transmission, according to claim 11, wherein said line pressure control unit adds a first margin when said engine output torque suppressing unit determines that the output torque can be sufficiently suppressed, and adds a second margin greater than the first margin when said engine output torque suppressing unit determines that the output torque cannot be sufficiently suppressed.

13. A continuously variable transmission, according to claim 10, wherein said line pressure control unit gradually decreases the target line pressure from a coercively increased target line pressure after said engine output torque suppressing unit determines that the engine torque can now be sufficiently suppressed.

14. A continuously variable transmission, according to claim 10, wherein said line pressure control unit gradually increases the target line pressure to a coercively increased target line pressure after said engine output torque suppressing unit determines that the engine torque cannot be sufficiently suppressed.

15. A line pressure control method for a continuously variable transmission having a first rotary element and a second rotary element in contact with the first element, comprising:

setting a target line pressure based on an output torque of an engine;

controlling an actual line pressure such that an actual line pressure matches the target line pressure;

determining whether the output torque can be sufficiently suppressed, such that the first and second rotary elements can be prevented from slipping, based on an operating condition of an engine;

suppressing the output torque when the output torque can be sufficiently suppressed; and coercively increasing the target line pressure when the output torque cannot be sufficiently suppressed.

16. The method of claim 15, further comprising:

gradually decreasing the coercively increased target line pressure.

17. The method of claim 15, wherein said coercively increasing step includes the step of gradually increasing the target line pressure.

* * * * *